United States Patent [19]

Boulanger et al.

[11] Patent Number: 5,004,298

[45] Date of Patent: Apr. 2, 1991

[54] METHOD OF RAPIDLY ABANDONING LARGE CAVITIES WASHED-OUT IN ROCK SALT

[75] Inventors: Alain Boulanger, Levallois-Perret; André J. Rousseau, Neuilly-sur-Seine, both of France

[73] Assignees: Geostock S.A.R.L., Cedex; ESYS S.A., Paris, both of France

[21] Appl. No.: 360,816

[22] Filed: Jun. 2, 1989

[30] Foreign Application Priority Data

Jun. 2, 1988 [FR] France .................................. 88 07336

[51] Int. Cl.⁵ .................... B09B 3/00; E21B 43/28; E21B 47/04
[52] U.S. Cl. ......................................... 299/5; 166/253; 166/285; 166/292; 405/128
[58] Field of Search ............... 166/268, 275, 285, 290, 166/292, 293, 294, 250; 175/50; 299/3, 4, 5, 6, 11; 405/267, 128, 264, 263, 57, 53; 209/172, 172.5; 210/702, 703, 705, 744, 747

[56] References Cited

U.S. PATENT DOCUMENTS

| | | | |
|---|---|---|---|
| 1,812,943 | 7/1931 | Granger | 166/250 |
| 2,524,933 | 10/1950 | Silverman | 166/250 |
| 3,366,419 | 6/1968 | Pasternak et al. | 299/5 |
| 3,724,898 | 4/1973 | Jacoby | 299/5 |
| 4,007,964 | 2/1977 | Goldsmith | 299/4 |
| 4,275,788 | 6/1981 | Sweatman | 166/292 |
| 4,367,985 | 1/1983 | Tomaszewski et al. | 405/264 |
| 4,456,400 | 6/1984 | Heide et al. | 405/128 |
| 4,576,513 | 3/1986 | Lindörfer et al. | 405/128 |
| 4,577,999 | 3/1986 | Lindörfer et al. | 405/53 |
| 4,692,061 | 9/1987 | Lindörfer et al. | 405/128 |
| 4,746,249 | 5/1988 | Haigh et al. | 405/264 |

*Primary Examiner*—George A. Suchfield
*Attorney, Agent, or Firm*—Sughrue, Mion, Zinn, Macpeak & Seas

[57] ABSTRACT

After they have been washed out, cavities (4) in rock salt contain a large quantity of brine (8) at a temperature which is lower than the temperature of the surrounding formation (2). This means that the cavity cannot be sealed quickly because the brine will expand progressively as it heats up. The method of the invention serves to shorten the time period between the end of working the cavity for salt and being able to abandon the cavity finally from about 30 years to about 2 years. The method consists in injecting quantities of a mixture (12) into the cavity (4), the mixture being of greater density than brine (8) and being capable of setting, with equivalent quantities of brine (8) being returned to the surface, and then in keeping the cavity (4) open after it has been completely filled with mixture (12) for as long as it takes the rock salt (2) to creep and fill up the shrinkage voids which appear during setting of the mixture (12), after which the cavity (4) can be sealed. To do this, it is advantageous to make use of waste material for constituting the mixture (12).

20 Claims, 4 Drawing Sheets

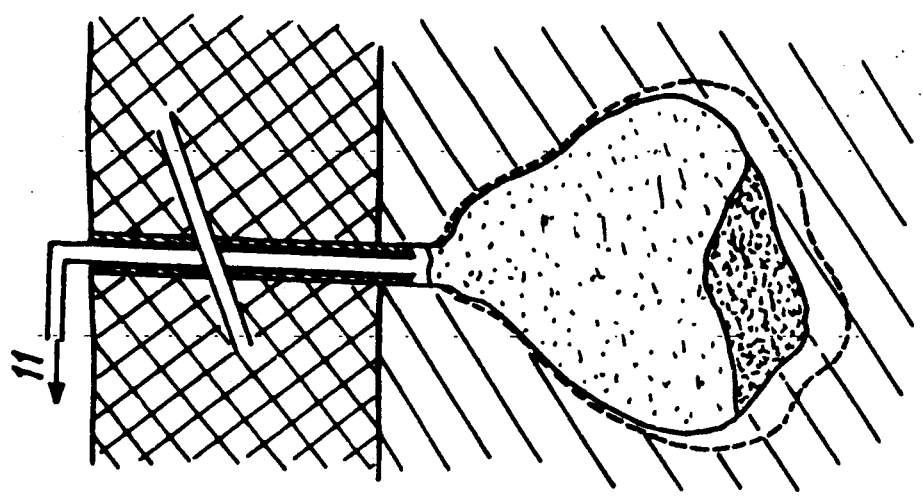
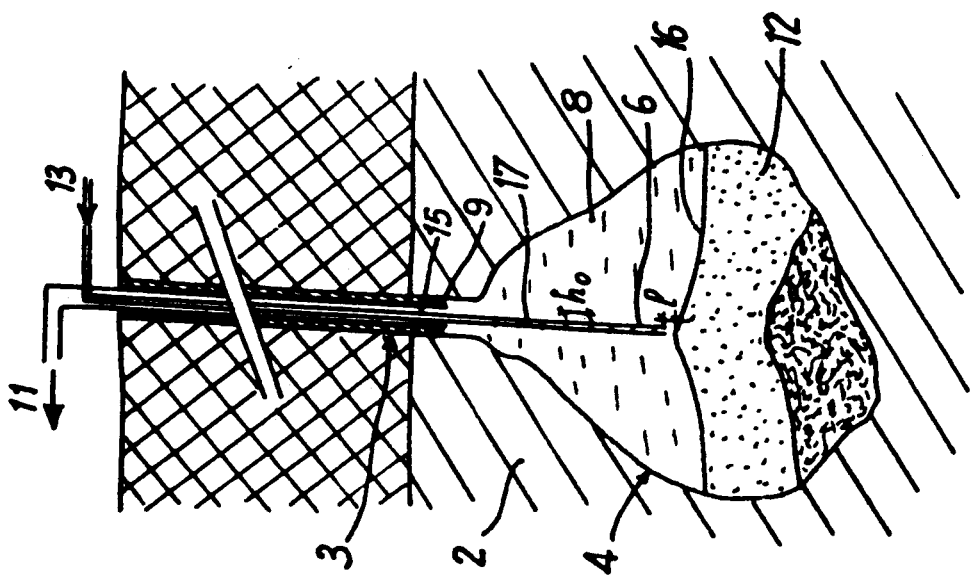
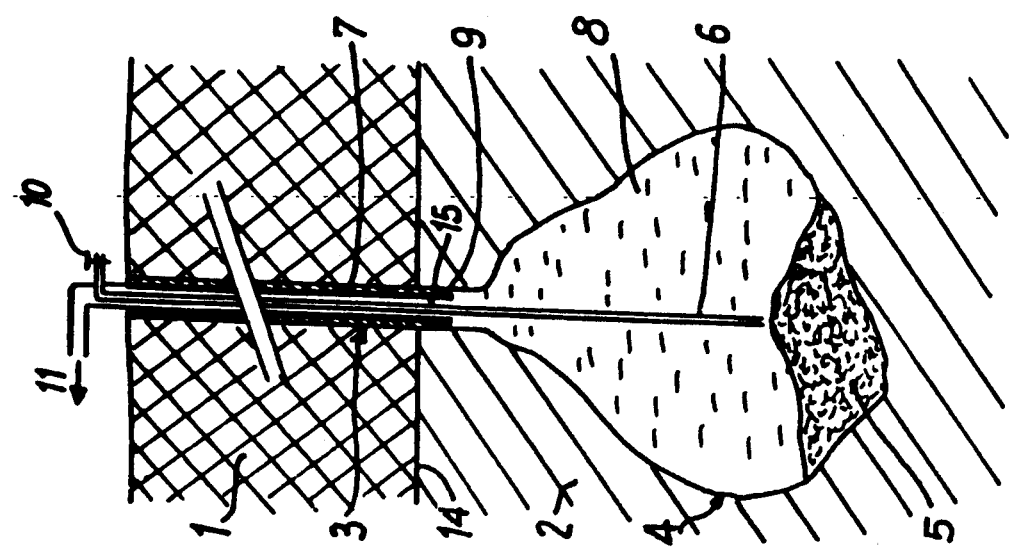

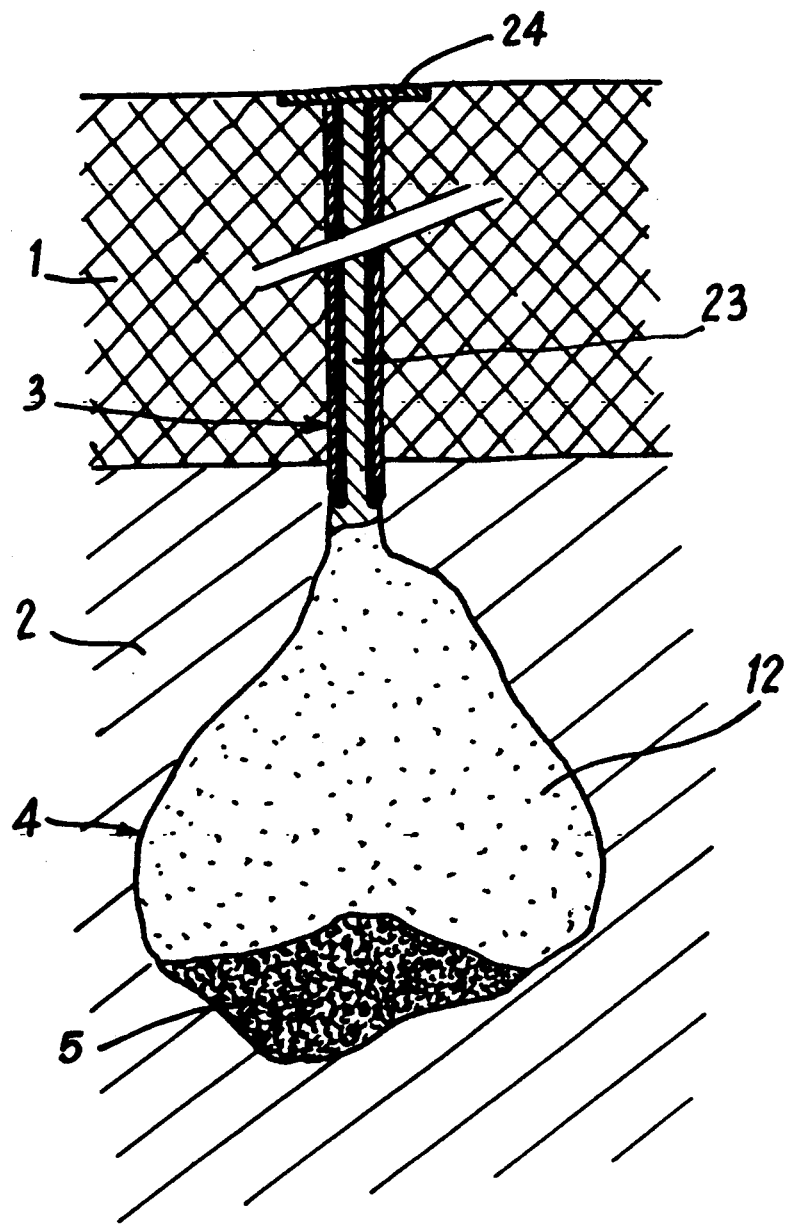

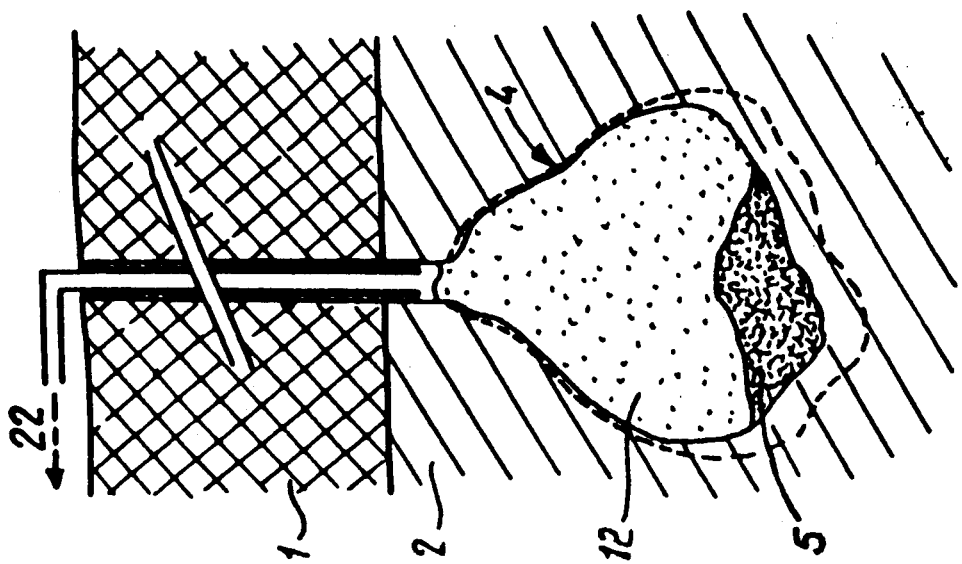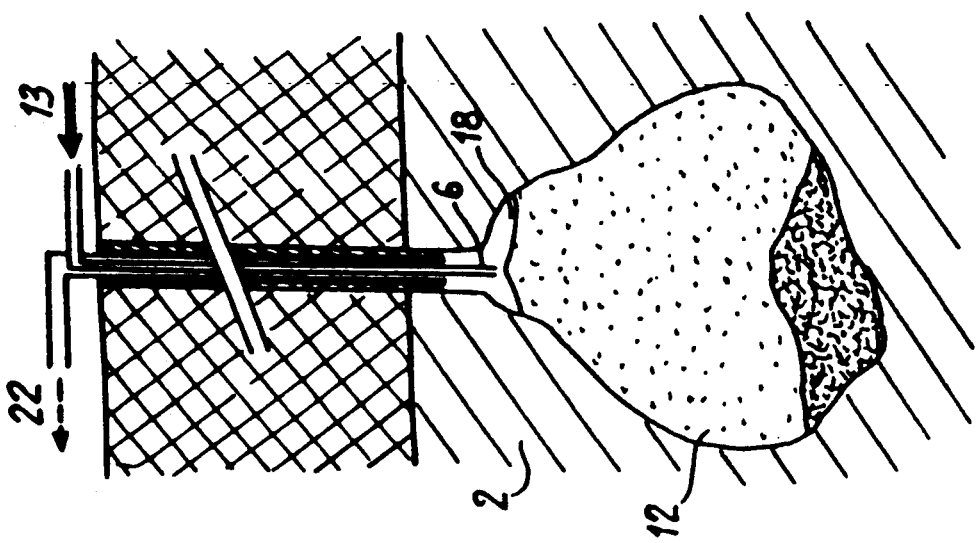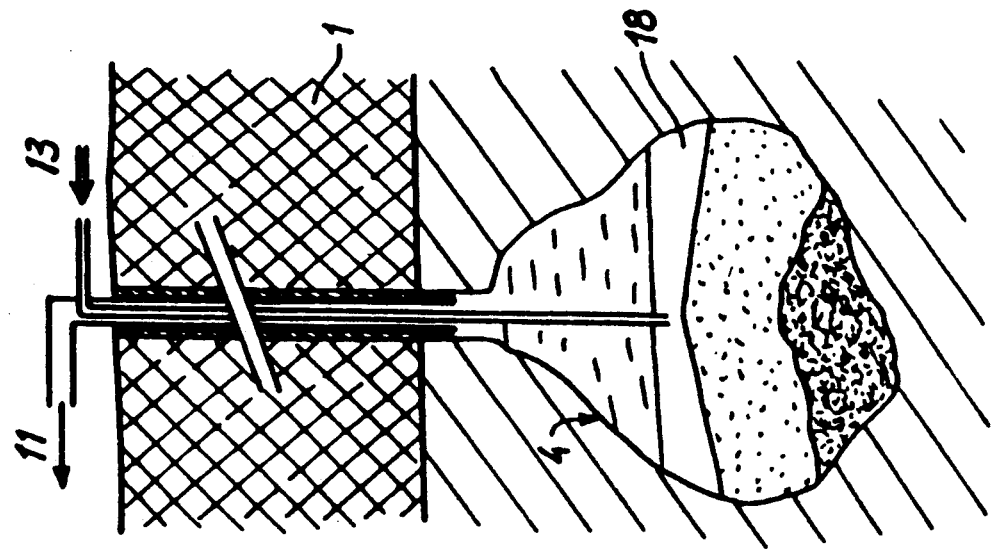

METHOD OF RAPIDLY ABANDONING LARGE CAVITIES WASHED-OUT IN ROCK SALT

BACKGROUND OF THE INVENTION

When an underground quarry or mine has been worked out, there remain underground voids which, in the absence of suitable support measures being taken, run the risk of collapsing and giving rise to ground subsidence which is damaging to surface infrastructure. Therefore, prior to ceasing to monitor cavities, it is appropriate to implement means suitable for avoiding any subsequent disturbance. The present invention relates to such means which are applicable to particularly thick deposits of rock salt (several hundred meters thick), and more precisely to deposits which have been worked out by being washed out.

Conventional methods of packing or caving in are not usable in such deposits, because of excavation conditions, washed-out cavities are generally in communication with the surface via a single borehole and they are therefore inaccessible to personnel or to conventional equipment for packing by means of deads. Although they are usually at depths of more than 500 meters, their size of several hundreds of thousands of cubic meters makes them unsuitable for caving in since that will give rise to unacceptable sinking on the surface. This destructive method will normally also give rise to major changes in the flow patterns of underground water, thereby considerably accelerating underground erosion of the salt formation. It is therefore desirable to set up durable support inside the washed-out cavity. At present, the brine present at the end of washing out is used for this purpose. The liquid exerts forces on the wall of salt which are sufficient for stabilizing changes therein over a human life span.

However, this result does not obtain immediately after salt extraction has stopped. The injected fresh water which saturates with dissolved salts on making contact with the walls of salt is at a lower temperature than the surrounding formation, usually by several tens of degrees centigrade at the depths under consideration. This reduces the temperature of the ground surrounding the cavity. After working has stopped, this ground is reheated by geothermal heat flow. Little by little the brine is heated thereby, and consequently it expands. Its volume continues to increase until the temperature of the brine reaches that of the surrounding rock. During this transient period, it is undesirable to seal the cavity. If the cavity is sealed prematurely, the pressure of the brine can increase sufficiently to break the plug of cement closing the borehole. The plug cracks, thereby leaving a path for the brine to reach higher water levels, thereby polluting them.

A washed-out cavity can therefore be abandoned only after thermal equilibrium has been reached both within the rock and between the rock and the brine. In spite of the convection movements in the brine due to the large temperature difference between the ceiling and the sides of the cavity (typically 30° C.) and the resulting improved heat exchange, because of the considerable volumes involved this equilibrium is reached only after a period of many years. Operating companies generally plan to abandon sites after a period of 30 years. During this period of time, the pressure of the brine at the top of the borehole is monitored and it is regularly lowered to below the lithostatic pressure. It is clear that however well such monitoring may be automated, it continues to represent an unwelcome obligation by virtue of its long duration.

It is therefore the object of the present method of abandoning to reduce to a few years the length of time for which monitoring must be continued after the site is no longer worked and the borehole has been sealed. This is achieved by injecting into the cavity quantities of a mixture which is denser than brine and which is capable of setting, while simultaneously withdrawing equivalent quantities of brine from the cavity, and continuing until the cavity has been completely filled with the mixture. As a result, the cavity remains filled at all moments with liquid or solid which applies a supporting force to the cavity walls. There is therefore no danger of a general collapse.

In itself, this method is not new and has been developed more particularly for disposing of waste which is incorporated in the injected mixture. An example is described in published German patent application DE-A-3 141 884. However, this prior document still proposes a method where the cavity filled with mixture is sealed only after a waiting period which corresponds to thermal equilibrium being reestablished at the site. Thus, just as when the cavity is filled with brine, monitoring must be continued for several tens of years. There can be no question of leaving unmonitored an open borehole which extends down to salt-bearing strata which are naturally extremely soluble and which are therefore at the mercy of the slightest infiltration of fresh water.

SUMMARY OF THE INVENTION

The novelty of the present method lies in the waiting period between the cavity being completely filled by the above-mentioned method and said cavity being sealed being determined by the time required for said rock salt to creep into and close the shrinkage voids that appear due to the setting of said mixture completely filling said cavity.

In other words, the walls of the cavity are allowed to converge under thrust from the overlying earth such that the shrinkage voids in the set mixture are closed up. A large part of the brine or other liquid used in making up the mixture and which initially fills these voids is thus expelled from the cavity which is left open in order to allow this liquid to depart. Calculation shows that this happens within two to three years from the cavity being filled. This is a much shorter period of time than that required to establish thermal equilibrium in the deposit which is normally reckoned to about 30 years. Unlike the prior art method described initially, and unlike the method of document DE-A-3 141 884, the present invention therefore avoids the need to keep the cavity open for a long period of time. A negligible quantity of liquid still capable of expanding remains in the cavity. Thus, in spite of sealing taking place before the temperature has stabilized, there is no danger of undesirable excess pressure.

BRIEF DESCRIPTION OF THE DRAWINGS

This method of abandoning is now described with reference to drawings which are diagrammatic vertical sections through a formation of rock salt having a washed-out cavity therein. It should be observed that the cross-sections of the vertical boreholes as shown are completely out of proportion. Borehole sections are greatly exaggerated for the obvious purpose of clarifying the drawings. These drawings are given purely by way of non-limiting example of various possible ways in which the method of the invention can be implemented.

In the drawings:

FIGS. 1 and 5 are identical. They show a washed-out cavity which has been fully worked out.

FIG. 2 shows the FIG. 1 cavity while it is being filled in accordance with a first implementation of the method of the invention.

FIGS. 3 and 10 include dashed lines representing the initial wall of the cavity and solid lines showing its new outline prior to being sealed.

FIG. 4 is a diagram showing the cavity after sealing.

FIGS. 6, 7, 8 and 9 show the same cavity, but being filled using a second implementation of the method of the invention.

DETAILED DESCRIPTION

Figure 5:
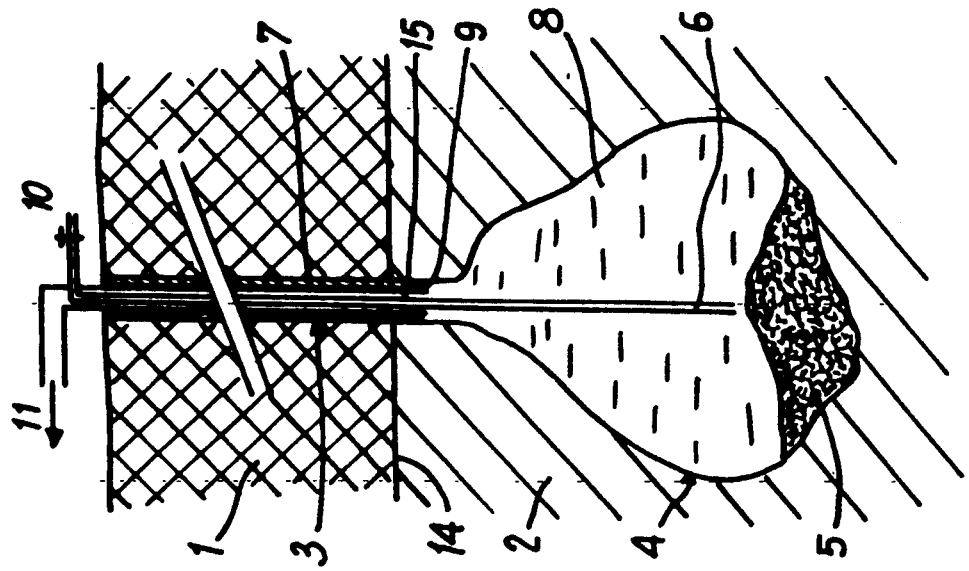

As shown very diagrammatically in FIG. 1, the structure of a rock salt deposit can be considered, very simply, as comprising a cover 1 and a salt-bearing formation 2. Whereas the cover 1 is typically made up of sedimentary rocks including layers of water and may be several hundred meters thick, the salt-bearing formation 2 is constituted by evaporites which is impermeable, or substantially impermeable. When the salt deposit is very thick (several thousands of meters thick) as in salt domes, diapirs, or some strata, it is particularly advantageous to extract the salt by washing it out. This technique consists in injecting fresh water into the salt-bearing formation 2 by means of a dip tube 6 placed inside a borehole 3. The water dissolves the salt, initially around the borehole and then at the wall of a cavity 4 which continues to grow. By virtue of their weight, insoluble impurities 5 collect at the bottom of the cavity, whereas the brine is pumped up via the annular space 15 between the dip tube 6 and the casing 7 in the borehole 3. In addition, the good mechanical properties of rock salt make it possible to remove large volumes therefrom. This gives rise to cavities in a wide variety of shapes. In any event, their final height may be as much as several hundred meters for a diameter of about 60 meters.

When the cavity has been worked out, it is no longer supplied with fresh water (valve 10 is closed). It is then full of brine 8. As mentioned above, communication must be maintained between the surface and the brine which is in the process of expanding by virtue of being heated, for the purpose of avoiding an increase in the pressure of the liquid contained in the cavity. For example, each time the pressure measured at the casing guide shoe 9 exceeds the weight of earth at the same depth, brine is bled off as represented by continuous arrow 11.

A first implementation of the method of the present invention (see FIGS. 1 to 3) then consists in injecting a mixture 12 into the cavity as shown diagrammatically in FIG. 2, said mixture being injected while in liquid form but being suitable for setting. It is preferable to do this using the same dip tube 6 as was used for injecting fresh water while the salt was being extracted. The mixture is injected from the surface (represented by double arrow 13) by means of a pump, and advantageously by means of a Putzmeister type piston pump. While a quantity of mixture 12 is being injected into the cavity, a substantially equivalent quantity of brine 8 is delivered to the surface (represented by continuous arrow 11) via the annular channel 15.

Given the considerable volumes involved, it is most important that the mixture 12 should be as cheap as possible. The idea of it being made up essentially of waste is therefore most attractive. This is made even more attractive by the fact that rock salt is particularly impervious to water and consequently waste, even if it is polluting waste, can be placed therein without danger for the environment. Economically it is then advantageous to make up this mixture from waste which has no satisfactory outlet by virtue of its contaminating power or because of its high cost of elimination by other means. Suitable substances include, for example;

Liquids, baths and sludge containing cadmium and cyanide

Liquids, baths and sludge containing cadmium but not cyanide

Acid liquids, baths and sludge containing chromium

Non-acid liquids, baths and sludge containing chromium

Liquids, baths and sludge containing cyanide

Other liquids, baths and sludge containing non-precipitated metals

Solvents containing halogens

Aqueous wastes soiled with solvents containing halogens

Non-aqueous halogen-containing residues from solvent regeneration

Non-aqueous residues from solvent regeneration containing no halogens

Insulating oils containing chlorine

Oils containing PCBs or PCTs

Paint, varnish, or glue sludge containing an aqueous phase

Paint, varnish, or glue sludge containing an organic phase

Paint, varnish, or glue wastes containing no liquid phase

Ink or dye wastes containing an organic phase

Greases, fats, lubricants, or film-forming substances of inorganic origin (other than engine oils or mixed entire inorganic oils)

Soaps, fats, lubricants, or film forming substances of vegetable or animal origin Tempering salts and other solid wastes from heat treatments using cyanide Tempering salts and other solid wastes from heat treatments not using cyanide Wastes containing asbestos fibers which are free or capable of being freed Fine dust and fly ash Used foundry sand Mother liquors for saline fabrication processes Mother liquors for non-saline fabrication processes Pitch, tar, bitumen Manufacturing by-products and rejects derived from organic synthesis (other than and liquid residues of manufacturing distillation)

Water used for washing equipment in chemical or parachemical industry

Soiled residue calcium sulfate (phosphorus-containing gypsum, . . . )

Solid metal oxide residues

Alcali-free solid metal salt residues

Exhausted catalysts

Sulfur residue

Metal hydroxide sludge that has been subjected to dehydration treatment

Metal hydroxide sludge that has not been subjected to dehydration treatment

Residues from sedimentation, filtration, and centrifuging (other than liquid mixtures of water and hydrocarbons, and sludges from neutralizing acid, absorbant, or adsorbant effluents, and Exhausted or saturated ion exchange resins Sulfur-containing tar Gas washing sludge Drilling mud Materials and equipment soiled with PCBs or PCTs Manufacturing wastes and rejects not included in the preceding categories Worn-out primary and secondary batteries and cells Waste from use of pesticides Waste from use of substances not included in the preceding categories Laboratory and chemical waste unsuitable for classification elsewhere by virtue of its packaging However, adopting this approach gives rise to technological constraints. The waste must not inhibit setting of the mixture 12. It must therefore be analyzed prior to use. In addition, it may be presented in various different forms: liquid form, particles of various sizes, solids. This means that in some cases it will need to be prepared prior to being included in the mixture 12. Liquids may possibly be solidified; solids may be crushed to obtain grains which are small enough to be transported hydraulically through the hoses of the injection pump and all the way down the dip tube 6 (having a diameter of about 7 inchs to about 10 inches). The waste is then added to a basic slurry to make up a mixture having, for example, 30% waste and 70% slurry, although the proportions could lie in the range 40%–20% waste for 60%–80% slurry, for example.

The purpose of the slurry is to enable the mixture to set. However it sets slowly and the mixture spreads suitably over the entire cross-section of the cavity in spite of being semi-solid. The need to use cheap substances means that a water-based binder is used and it is preferable to use residues in making up the slurry as well. The substances that enhance setting may be for example fly ash taken from plants for incinerating household waste and industrial waste, together with fly ash from the processing of smoke (from power stations or blast furnaces, for example), even if their mortar-forming properties are not optimal. It is advantageous to provide a quantity of fly ash lying between 50% and 70% of the quantity of dry matter used in the composition of the slurry. Between 10% and 30% lime may be added thereto, for example. Lime can also be recovered from the operation of chemical or industrial installations, e.g. from factories for making acetylene, plant for purifying water, residue from cement factories, etc. Similarly, the water is preferably taken from mother liquors for which there are currently no outlets. In spite of this relatively cheap composition, the slurry must also have favorable characteristics such as limited syneresis and drying, very low viscosity (a Marsh cone should flatten completely), and a relative density of greater than 1.5. For example, a slurry comprising 69% dust from the Montauban incineration works and 31% water may be used.

In addition, the supply of waste may be somewhat sporadic. Injection into the washed-out cavity is performed preferably in limited quantities (e.g. 1000 m$^3$ per week) and it is left at rest between injections. It is therefore appropriate to prevent the base and the inside of the dip tube 6 from being locked into the mass of mixture that is setting. The bottom end of the tube is consequently kept above the surface 16 of the mixture (at $l=30$ cm, for example). This implies that means are used for detecting said surface, regardless of whether the mixture is still in liquid form or has already set. A Rossignol type of probe may be suitable. The tube is moved by being dismantled piece-by-piece using a method well known to drillers. Each piece 17 of the tube may be $h_0=9$ meters (m) high, for example. After each injection operation, the inside of the tube must be cleaned. To do this, a scraper must be used, thrust either by brine or else by some other liquid. The scraper and an equivalent volume of brine or liquid are recovered at the end of the filling operation.

After the cavity has been filled by successive quantities of mixture in the manner explained above, the dip tube 6 may be finally removed from the borehole 3 (see FIG. 3). It is then necessary to wait for several years. When the mixture sets, it also shrinks to some extent. However, rock salt has the property of flowing like a fluid. This phenomenon is slow since the viscosity of this fluid is extremely high. The resulting creep is nevertheless capable of closing the cavity around the solid inclusion therein, thereby eliminating the voids left behind by the mixture after setting. Calculation shows that a waiting period of 2 to 3 years is then sufficient to ensure that all of the voids have disappeared. During this period, which is still very short compared with the previously expected monitoring periods, the borehole is kept open so as to evacuate the brine which occupied the shrinking voids prior to their being filled.

As shown in FIG. 4, a plug 23 is then cast in the borehole 3. The plug is advantageously constituted by a slurry of the same composition as that used for the mixture 12. Finally, a finishing slab 24 removes any trace of the underground cavity. The cavity is then completely abandoned, with the solid inclusion constituted by the set mixture 12 ensuring that its walls are supported stably.

Figure 6:
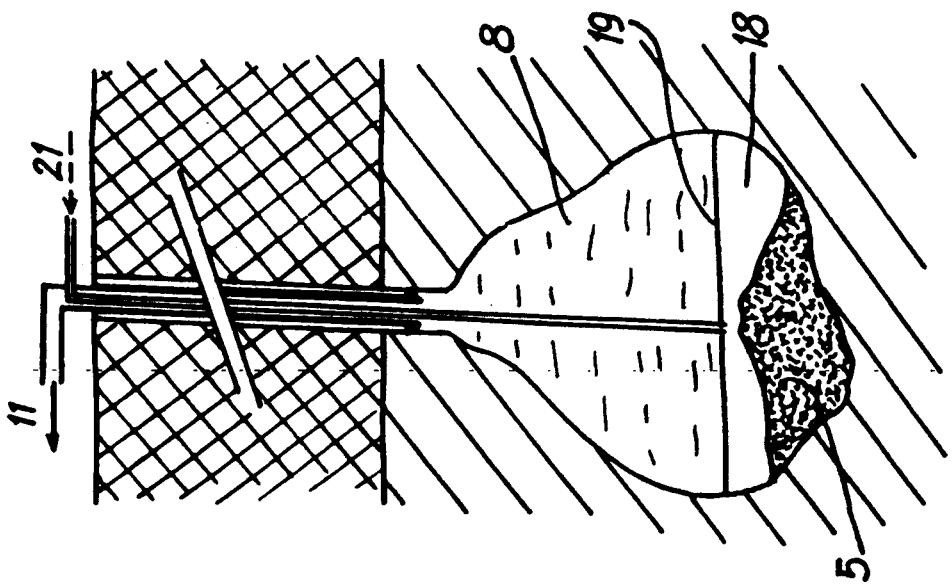
Figure 7:
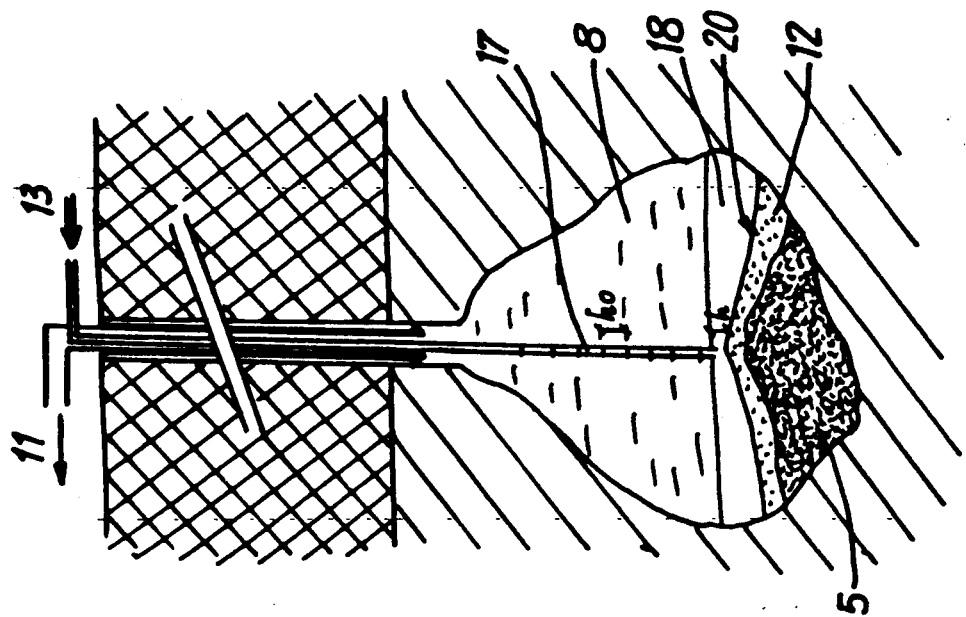

In a second implementation of the method of the invention (see FIGS. 5 to 10) a predetermined quantity of a "buffer" liquid 18 is initially injected into the cavity. This liquid is immiscible with brine and is denser than brine (i.e. having a relative density of greater than 1.2, and preferably close to 1.3). Consequently, it remains in the bottom of the cavity as shown in FIG. 6. The buffer liquid is preferably an organic solvent based on halogen-containing derivatives of greater density than brine. This ensures that subsequently injected mixture 12 (see FIG. 7) does not come into contact with the brine. This is advantageous when the waste used in making up the mixture could contaminate the brine and therefore make it unsuitable for sale.

However, it is then necessary to monitor the conditions under which the mixture is injected. The bottom end of the dip tube 6 must then always remain in the buffer liquid. Since this tube is dismantled by pieces of height $h_0$ typically equal to 9 m, the depth h of the buffer liquid must be greater than $h_0$ (and therefore generally close to 10 m) regardless of the cross-section of the cavity. Means must therefore be provided for detecting the interface 19 between the buffer liquid and the brine. In this respect, it may be highly advantageous to measure density contrast by means of a neutron probe or by means of a gamma-gamma probe. In addition, any break in the dip tube which could contaminate the brine must be detected, at least. One way of doing this is to ensure that each piece 17 of the dip tube 6 has an electrical resistance fixed thereto. If all of the corresponding resistances are in parallel, any break in the electric wire connecting them, e.g. at the junction between two pieces 17, will give rise to a considerable change in the current flowing therethrough, thereby indicating that damage has occurred.

For the most part, the cavity is filled with mixture 12 in this second implementation in the same way as in the first implementation. The substance is injected (as represented by double arrows 13 in FIGS. 7 and 8) and an equivalent quantity of brine is bled off (as represented by continuous arrows 11 in the same figures), which brine is immediately usable in the chemical industry. It is only towards the end of the filling operation that the buffer liquid is recovered, in turn (represented by dashed arrow 22 in FIG. 9). Thereafter, as in the first implementation, it is necessary to wait for creep of the cavity wall over the solid inclusion of set mixture to take place prior to final sealing and abandoning of the cavity.

We claim:

1. A method of rapidly abandoning a cavity washed out in rock salt and initially filled with brine, said method comprising the following steps:
   (a) injecting quantities of a mixture into said cavity, the density of said mixture being greater than that of the brine, and the mixture being capable of setting, with equivalent quantities of said brine being simultaneously displaced upwardly and expelled from said cavity,
   (b) continuing such injection and brine expulsion until said cavity is completely filled with said mixture;
   (c) maintaining communication between the outside and said filled cavity during a waiting period whose length is exclusively determined by the time required for the injected mixture to set and for said rock salt to creep into and close shrinkage voids that develop in the set mixture, without regard to the establishment of thermal equilibrium in and surrounding the cavity; and
   (d) thereafter sealing said cavity.

2. A method according to claim 1, said cavity communicating with the outside via at least one borehole, and a dip tube having its bottom end suitable for being placed in said at least one borehole so as to constitute an annular space between the wall of said borehole and the wall of said dip tube:
   wherein during said injection step, said mixture is injected via said dip tube while said brine is removed via said annular space, said bottom end of said tube being maintained above the surface of said mixture at a predetermined height;
   wherein during said step of maintaining communication between the outside and said filled cavity, said tube is withdrawn from said borehole and said borehole is kept open: and
   wherein during said sealing step, a plug is cast into said borehole.

3. A method according to claim 2, wherein detector means are provided for locating said surface of said mixture and for detecting any breakage in said dip tube during said injection step.

4. A method according to claim 2, wherein prior to said injection step, said method includes a preliminary step of injecting a predetermined quantity of a buffer liquid which is immiscible with said brine and whose density is greater than that of said brine and less than that of said mixture, said injection being performed via said dip tube while an equivalent quantity of said brine is expelled to the surface via said annular space, said bottom end of said dip tube being maintained in said buffer liquid during said mixture injection step, with the buffer liquid being in turn expelled to the outside when said cavity is completely filled.

5. A method according to claim 4, wherein detector means are provided for locating the interface between the brine and the buffer liquid during said mixture-injection step.

6. A method according to claim 4, wherein said dip tube is made up of disconnectable tubular pieces each having height $h_0$, said predetermined quantity of said buffer liquid being determined so that the depth h of the buffer liquid in said cavity always remains throughout said injection step greater than said height $h_0$ of the pieces of the dip tube, said bottom end of said tube being maintained within said buffer liquid by removing the pieces one after the other.

7. A method according to claim 4, wherein the relative density of said buffer liquid lies in the range 1.2 to 1.7.

8. A method according to claim 7, wherein the relative density of said buffer liquid is approximately 1.3.

9. A method according to claim 4, wherein said buffer liquid contains one or more halogen-containing solvents.

10. A method according to claim 1, wherein the relative density of said mixture is not less than 1.5.

11. A method according to claim 1, wherein said mixture is constituted by a first fraction of waste material and by a second fraction of slurry in addition to said first fraction, said first fraction being smaller than said second fraction.

12. A method according to claim 11, wherein said first fraction of the waste in said mixture lies between 40% and 20%.

13. A method according to claim 11, wherein said waste is polluting waste having no economic outlet.

14. A method according to claim 13, wherein said waste is taken from the following list:
   Liquids, baths and sludge containing cadmium and cyanide,
   Liquids, baths and sludge containing cadmium but not cyanide,
   Acid liquids, baths and sludge containing chromium,
   Non-acid liquids; baths and sludge containing chromium,
   Liquids, baths and sludge containing cyanide,
   Other liquids, baths and sludge containing non-precipitated metals,
   Solvents containing halogens,
   Aqueous wastes soiled with solvents containing halogens,
   Non-aqueous halogen-containing residues from solvent regeneration,
   Non-aqueous residues from solvent regeneration containing no halogens,
   Insulating oils containing chlorine,
   Oils containing PCBs or PCTs,
   Paint, varnish, or glue sludge containing an aqueous phase,
   Paint, varnish, or glue sludge containing an organic phase,
   Paint, varnish, or glue wastes containing no liquid phase,
   Ink or dye wastes containing an organic phase,
   Greases, fats, lubricants, or film-forming substances of inorganic origin, Soaps, fats, lubricants, or film-forming substances of vegetable or animal origin,
Tempering salts and other solid wastes from heat treatments using cyanide,
Tempering salts and other solid wastes from heat treatments not using cyanide,
Wastes containing asbestos fibers which are free or capable of being freed,
Fine dust and fly ash,
Used foundry sand,
Mother liquors for saline fabrication processes,
Mother liquors for non-saline fabrication processes,
Pitch, tar, bitumen,
Manufacturing by-products and rejects derived from organic synthesis,
Water used for washing equipment in chemical or parachemical industry,
Soiled residue calcium sulfate,
Solid metal oxide residues,
Alkali-free solid metal salt residues,
Exhausted catalysts,
Sulfur residue,
Metal hydroxide sludge that has been subjected to dehydration treatment,
Metal hydroxide sludge that has not been subjected to dehydration treatment,
Residues from sedimentation, filtration, and centrifuging,
Exhausted or saturated ion exchange resins,
Sulfur-containing tar,
Gas washing sludge,
Drilling mud,
Materials and equipment soiled with PCBs or PCTs,
Manufacturing wastes and rejects not included in the preceding categories,
Worn-out primary and secondary batteries and cells,
Waste from use of pesticides,
Waste from use of sub stances not included in the preceding categories, and
Laboratory and chemical waste unsuitable for classification elsewhere by virtue of its packaging.

15. A method according to claim 11, wherein said waste is subjected prior to being incorporated in said mixture, to preparation consisting in:
if said waste is in liquid form, in solidification by being trapped in a solid matrix; and/or
if said waste is solid or has been solidified, in splitting up said solid into grains capable of being transported hydraulically, in particular in said dip tube.

16. A method according to claim 11, wherein said slurry contains between 10% and 30% of lime relative to the weight of the dry matter constituting said slurry, the remainder of said slurry being constituted by fly ash and waste water.

17. A method according to claim 16, wherein said lime is recovered as a residue from the manufacture of acetylene, the purification of water, or the manufacture of cement.

18. A method according to claim 16, wherein said slurry contains between 50% and 70% fly ash relative to the weight of dry matter incorporated in said slurry.

19. A method according to claim 16, wherein said fly ash comes from a plant for incinerating household wastes and industrial wastes and from installations for processing the smoke given off by fossil fuel power stations or by blast furnaces.

20. A method according to claims 16, wherein said waste water comes from chemical or industrial treatment, and is constituted by mother liquors.

* * * * *